(12) United States Patent
Sugiura (10) Patent No.: US 6,304,010 B1
(45) Date of Patent: Oct. 16, 2001

(54) HYBRID-TYPE STEPPING MOTOR

(75) Inventor: Tsuneo Sugiura, Iida (JP)

(73) Assignee: Tamagawa Seiki Kabushiki Kaisha, Nagano-Ken (JP)

( * ) Notice: Subject to any disclaimer, the term of this patent is extended or adjusted under 35 U.S.C. 154(b) by 682 days.

(21) Appl. No.: 08/683,236

(22) Filed: Jul. 18, 1996

(30) Foreign Application Priority Data

Dec. 21, 1995 (JP) .................................................. 7-333147

(51) Int. Cl.[7] .......................... H02K 37/00; H02K 37/04
(52) U.S. Cl. .......................................... 310/49 R; 310/266
(58) Field of Search ................................. 310/49 R, 266

(56) References Cited

U.S. PATENT DOCUMENTS

| | | | |
|---|---|---|---|
| 4,286,180 | * | 8/1981 | Langley ............................... 310/49 R |
| 4,501,980 | * | 2/1985 | Welburn ............................... 310/49 R |
| 4,672,247 | | 6/1987 | Madsen et al. ........................ 310/49 R |
| 4,857,786 | * | 8/1989 | Nihei et al. .......................... 310/49 R |
| 4,920,292 | * | 4/1990 | Albrecht et al. ..................... 310/49 R |
| 4,922,145 | * | 5/1990 | Shtipelman .......................... 310/49 R |
| 4,945,268 | * | 7/1990 | Nihei et al. .......................... 310/49 R |
| 4,970,421 | * | 11/1990 | Kritzinger ........................... 310/49 R |

FOREIGN PATENT DOCUMENTS

| | | | |
|---|---|---|---|
| 3821660 | | 8/1989 | (DK) . |
| 240204 | * | 10/1987 | (EP) .................................... 310/49 R |
| 0544200 | | 6/1993 | (EP) . |
| 2052176 | | 6/1979 | (GB) . |
| 58-207856 | * | 12/1983 | (JP) .................................... 310/49 R |
| 02237456 | | 9/1990 | (JP) . |
| 6-303756 | * | 10/1994 | (JP) .................................... 310/49 R |

* cited by examiner

*Primary Examiner*—Karl Tamai
(74) *Attorney, Agent, or Firm*—Sughrue, Mion, Zinn, Macpeak & Seas, PLLC

(57) ABSTRACT

A hybrid-type stepping comprising inner and outer stator yokes on a fixed shaft, a barrel rotor between the inner and outer stator yokes, and bobbin-wound coils in coil slots formed on the outer and inner circumferences of the stator yokes, whereby coil winding operation is facilitated while a high torque is achieved.

1 Claim, 12 Drawing Sheets

(FLOW OF MAGNETIC FLUX
OF MAGNETIC PLATE)

FIG. 7

(FLOW OF MAGNETIC FLUX
OF COIL)

(FLOW OF MAGNETIC FLUX OF MAGNETIC PLATE)

FIG. 12

(FLOW OF MAGNETIC FLUX OF COIL)

HYBRID-TYPE STEPPING MOTOR

BACKGROUND OF THE INVENTION

1. Field of the Invention

The present invention relates to a hybrid-type stepping motor, and more specifically, to new improvements in the hybrid-type stepping motor in which the winding and placement of coils are facilitated by employing a solenoid-on-bobbin winding method and the density of coils is increased to provide a high efficiency and low cost design.

2. Description of the Related Art

Figure 1:
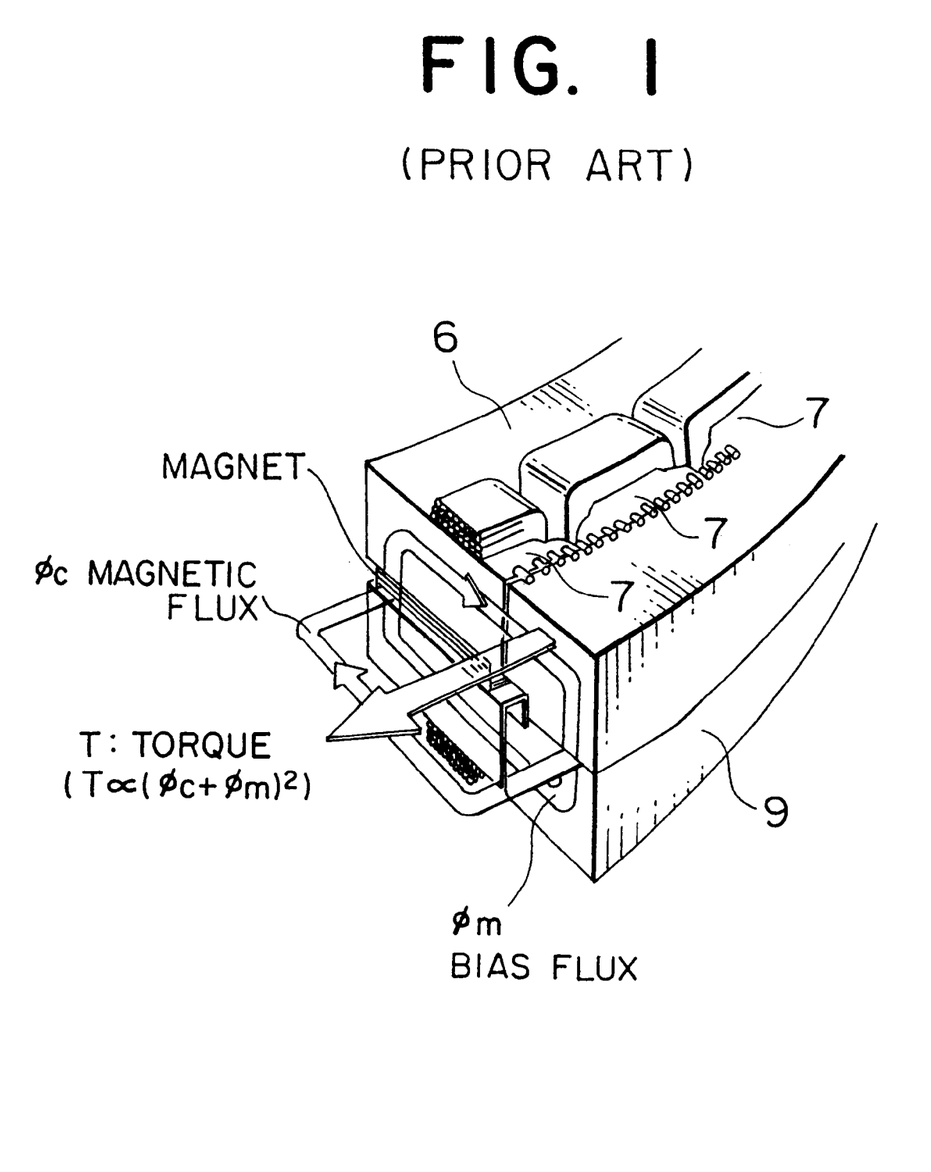
FIG. 1 is a perspective view showing the prior art motor.

In the hybrid-type stepping motor conventionally used, as shown in FIG. 1, a rotor yoke 9 as an outer rotor is rotatably supported by a stator yoke 6, and a coil is wound around each tooth 7 of the stator yoke.

Figure 2:
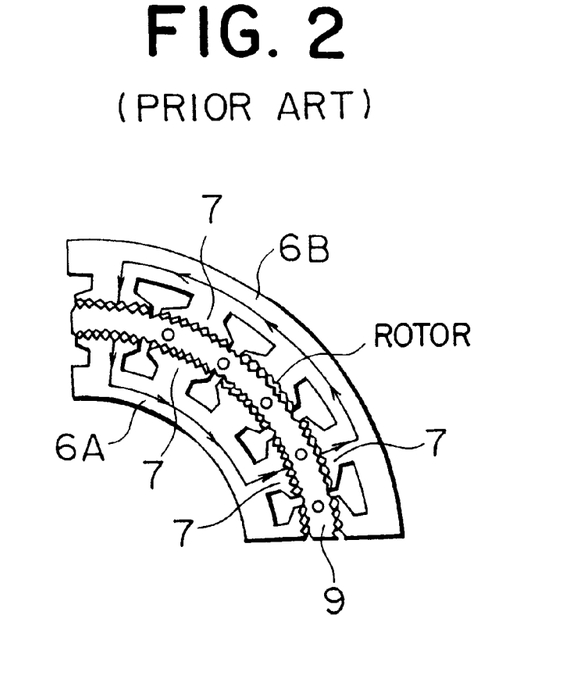
FIG. 2 is a plan view showing the prior art motor.
Figure 3:
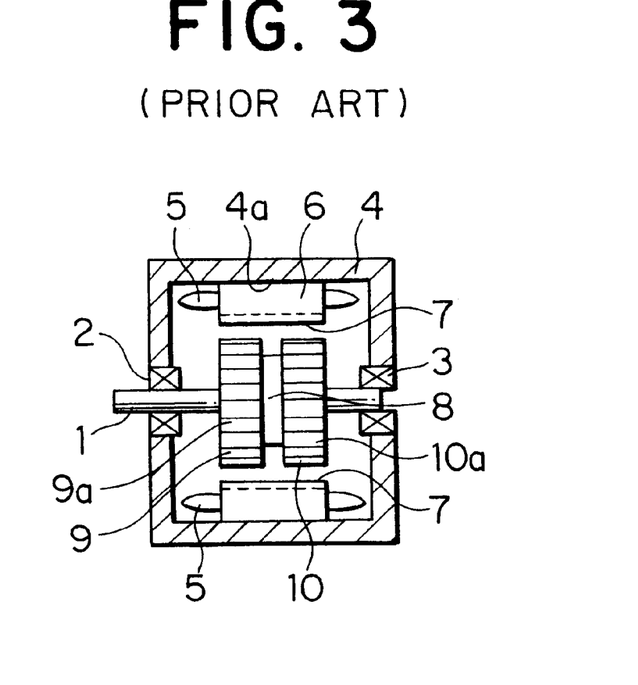
FIG. 3 is a cross-sectional view showing the prior art motor.

FIG. 2 shows the structure, disclosed by Nikkei Mechanical published Aug. 13, 1984, in which a rotor yoke 9 is rotatably supported between an inner stator yoke 6A and an outer stator 6B and an unshown coil is directly wound around each of the teeth 7 of the stator 6A, 6B. As shown in FIG. 3, a rotary shaft 1 is rotatably supported at a pair of bearings 2, 3 secured on both ends of a casing 4. A generally ring-shaped stator yoke 6 having a stator coil 5 is mounted on the inner surface 4a of the stator casing 4. A plurality of stator teeth 7 are spaced regular intervals apart circumferentially around the inner circumference of the stator yoke 6. Disposed between the bearings 2, 3 are ring-shaped first and second rotor yokes 9, 10 which are arranged in a unitary body on the rotary shaft with a magnet 8 therebetween, and the rotor yokes 9, 10 have on their circumferences, a plurality of rotor teeth 9a, 10a, and the rotor yokes 9, 10 alternate with each other in polarity. By supplying a driving pulse from an unshown driving circuit to the stator coil 5, the rotor yokes 9, 10 rotate stepwise.

The prior art hybrid-type stepping motor thus constructed has the following problems.

In the hybrid-type stepping motor having the rotor yokes having each magnet interposed therebetween as shown in FIG. 3, the stator coil wound around each tooth of the stator yoke is positioned inside the casing, and thus coil winding to each tooth is difficult and increasing the density of coil is difficult, too. In the structures shown in FIG. 1 and FIG. 2, the coil should be directly wound around each tooth, and thus the same above problems arise.

SUMMARY OF THE INVENTION

The present invention has been developed to solve the above problems, and it is an object of the present invention to provide a high-efficiency and low-cost stepping motor in which the winding and placement of coils are facilitated and the density of coils is increased.

The hybrid-type stepping motor of the present invention comprises a bearing mounted on a fixed shaft, a barrel rotor rotatably supported by the bearing, a plurality of rotor teeth provided on the outer circumference and inner circumference of the barrel rotor, first and second inner stator yokes arranged side by side in the direction of the fixed shaft with a magnet set therebetween and first and second outer stator yokes arranged side by side in the direction of the fixed shaft with the magnet set therebetween, a plurality of stator yoke teeth, first through fourth axially centered circular coil slots facing the barrel rotor and formed around the outer circumferences of the inner first and second stator yokes and the inner circumferences of the outer first and second stator yokes, and first through fourth coils wound in a solenoid-on-bobbin fashion and seated in the respective coil slots, whereby the stator yokes alternate in polarity and the barrel rotor is interposed between the coils.

More specifically, the magnet set comprises a first magnet interposed between the inner stator yokes and a second magnet interposed between the outer stator yokes.

More specifically, the magnet set comprises a first magnet interposed between the fixed shaft and the inner stator yokes and a second magnet interposed between the outer stator yokes and the outer wall of the fixed shaft, whereby the magnets face to each other via the barrel rotor.

DETAILED DESCRIPTION OF THE PREFERRED EMBODIMENTS

Figure 4:
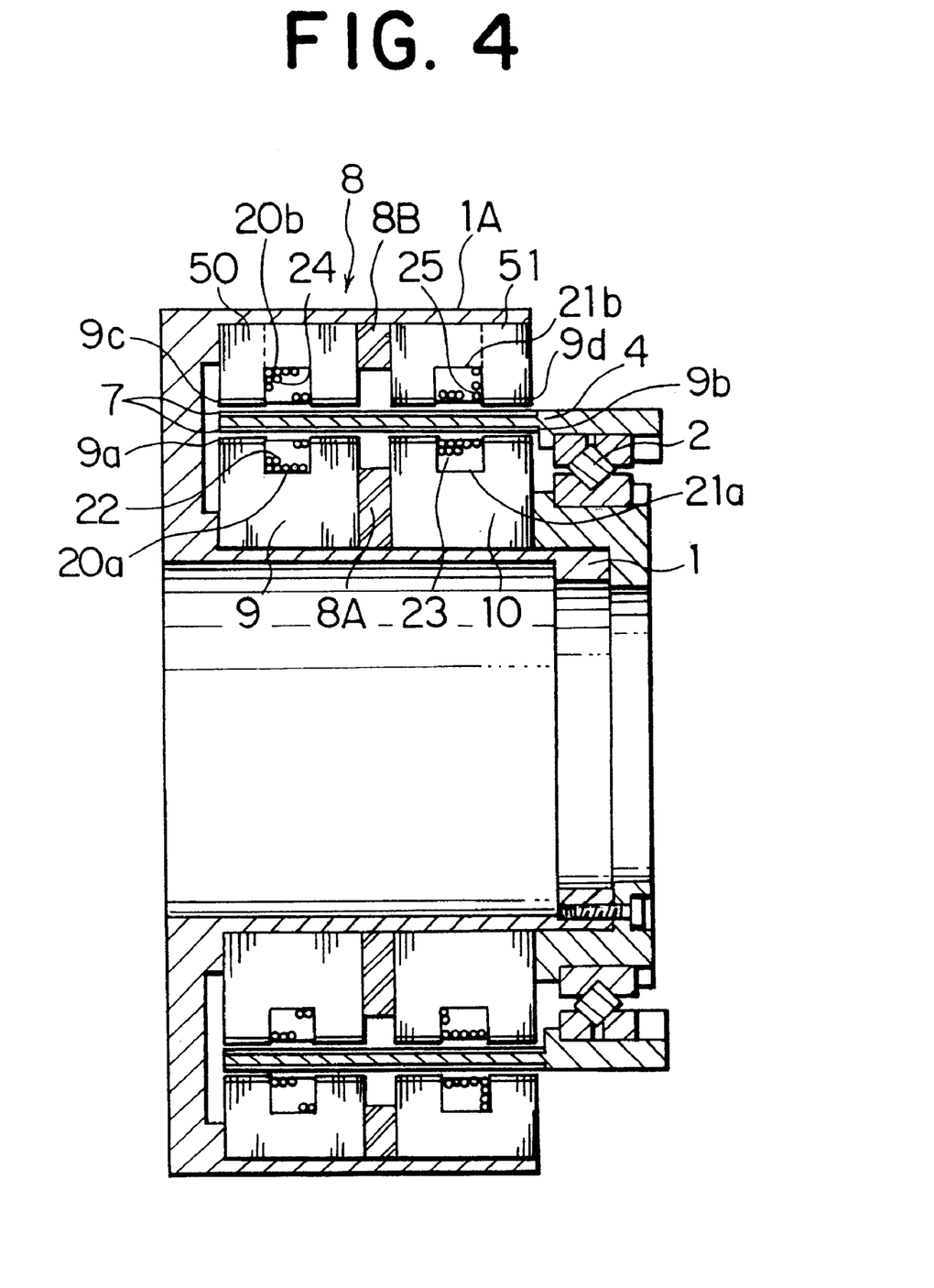
FIG. 4 is a cross-sectional view showing the hybrid-type stepping motor of the present invention.
Figures 5A, 5B:
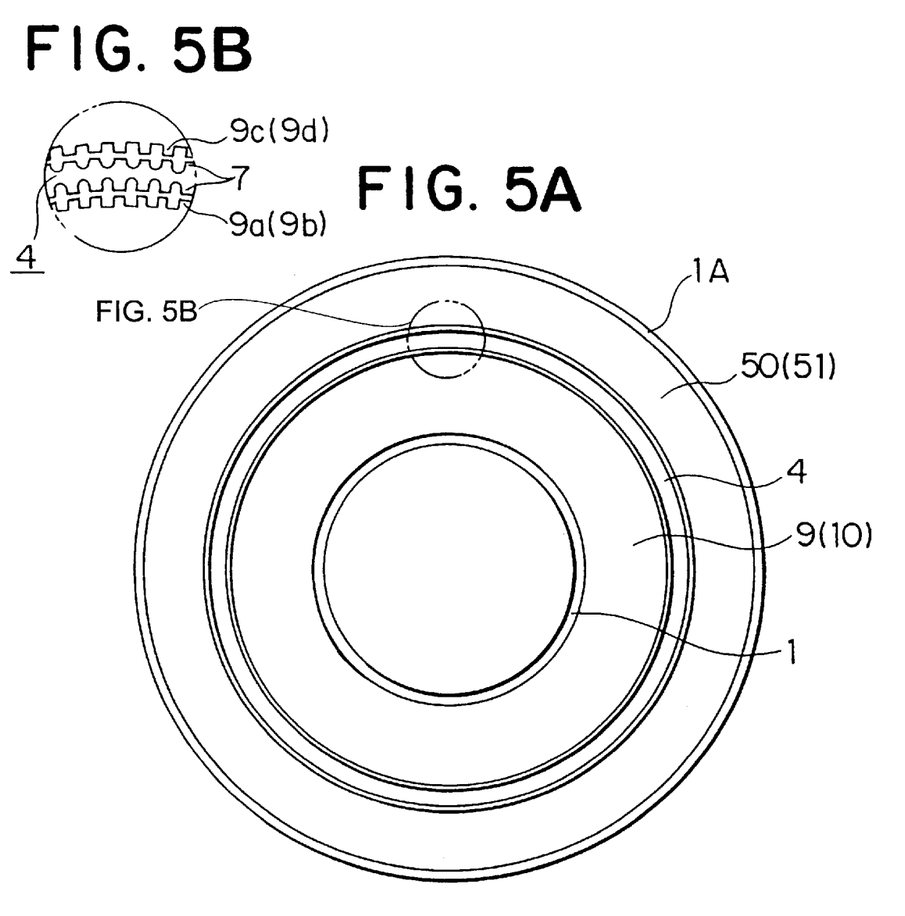
FIG. 5 is a transverse cross-sectional view of the stepping motor of FIG. 4.

Referring to the drawings, the preferred embodiments of the hybrid-type stepping motor according to the present invention are now discussed. Components identical or equivalent to those with reference to the prior art are designated with the same reference numerals. FIGS. 4 through 8 show a first embodiment, and FIG. 4 shows first an outer rotor structured hybrid-type stepping motor. Designated 1 is a hollow fixed shaft made of a non-magnetic material, and a bearing 2 mounted on the fixed shaft 1 rotatably supports a generally barrel-shaped rotor 4. The rotor 4 has, on its inner and outer circumferences, a plurality of teeth 7 as shown in FIG. 5.

Using first and second magnets 8a, 8b constituting the magnet set 8 on the fixed shaft 1, the ring-shaped first and second inner stator yokes 9, 10 are arranged side by side in the direction of the shaft with the magnet set 8 therebetween in a unitary body, and the stator yokes 9, 10 have axially centered circular coil slots 20a, 21a on their circumferences. The coil slots 20a, 21a have a first coil 22 and second coil 23, each wound in a solenoid-on-bobbin winding fashion (the coils 22, 23 are wound in an automatic method using a coil winding machine). The first stator yoke 9 has, on its circumference, first and second N poles, N1 and N2, between which the first coil 22 is interposed, and the second stator yoke 10 has, on its circumference, first and second S poles, S1 and S2, between which the second coil 23 is interposed, each of the poles N1, N2, S1 and S2 corresponds to the rotor teeth 7, and the poles N1, N2, S1, and S2 have a plurality of teeth 9a, 10a having the same pitch as that of the rotor teeth 7. As shown in the explanatory diagram in FIG. 8, the stator teeth 9a and 10a are formed so that the poles N1 and N2 are shifted off by a ½ pitch and that the poles S1 and S2 are shifted off by a ½ pitch, and the N poles N1 and N2 and the S poles S1 and S2 of the stator teeth 9a and 10a are shifted off by a ¼ pitch, respectively.

The fixed shaft 1 has, on its outer circumference, an outer wall 1A of an L shape in cross section, and mounted on the outer wall 1A are first and second stator yokes 50, 51 in the same manner as the inner stator yokes 9, 10 are installed, and the stator yokes 50, 51 have, on their inner circumferences, third and fourth axially centered circular coil slots 20b, 21b, third and fourth coils 24, 25, and stator teeth 9c, 9d, in the same way as the inner stator yokes 9, 10 have.

Figure 6:
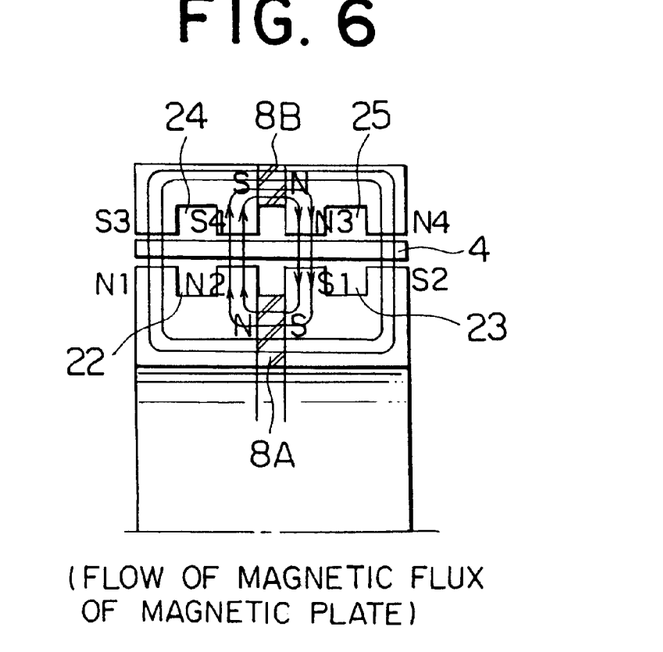
FIG. 6 is an explanatory diagram showing the flows of the magnetic fluxes generated by the magnet set.
Figure 7:
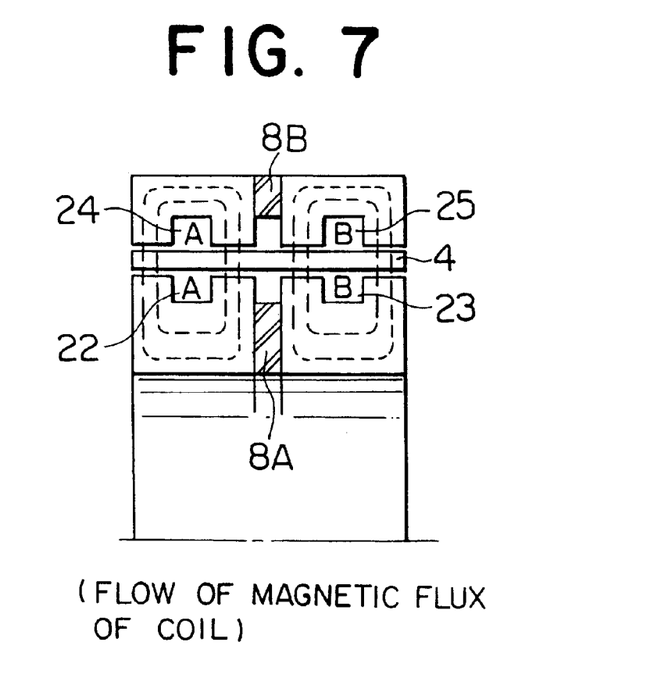
FIG. 7 is an explanatory diagram showing the flows of the magnetic fluxes generated by the coils.
Figure 8A:
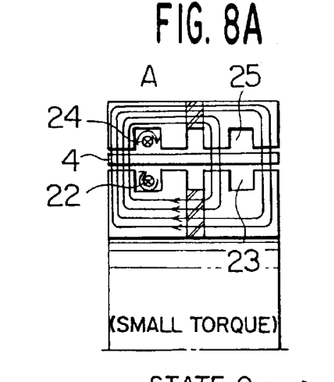
FIG. 8 is an explanatory diagram showing the combined fluxes by the magnet set and the coils with currents flowing therethrough, and the rotation of the rotor yoke.
Figures 8B, 8C:
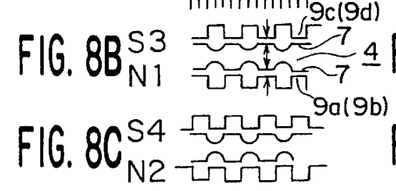
Figure 8D:
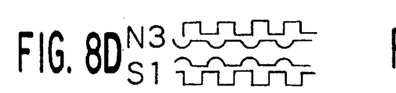
Figure 8E:
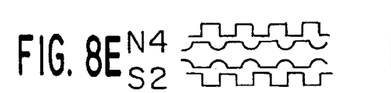
Figure 8F:
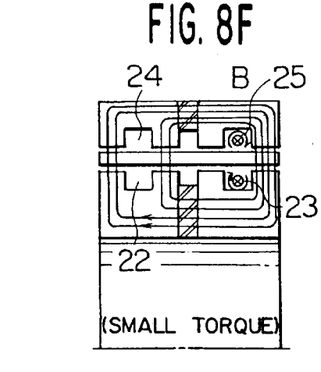
Figure 8G:
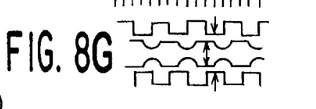
Figure 8H:
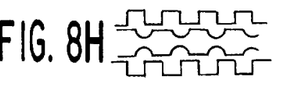
Figure 8I:
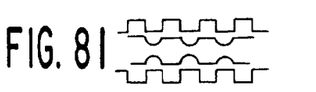
Figure 8J:
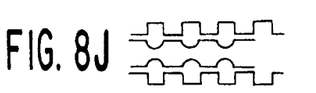
Figure 8K:
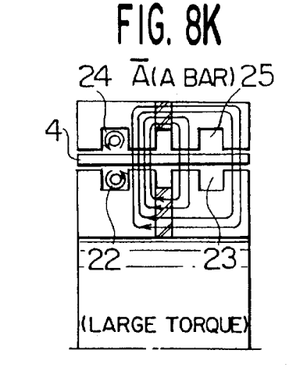
Figure 8L:
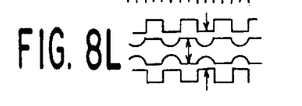
Figure 8M:
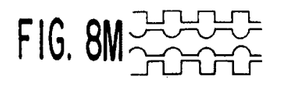
Figure 8N:
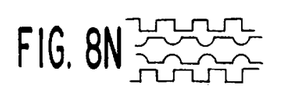
Figure 8O:
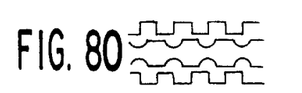
Figure 8P:
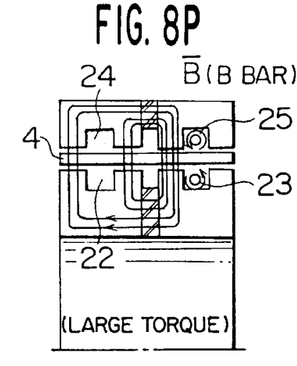
Figure 8Q:
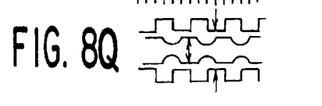
Figure 8R:
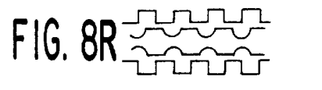
Figure 8S:
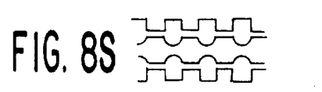
Figure 8T:
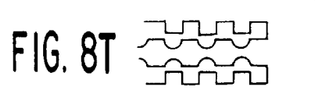
Figure 9:
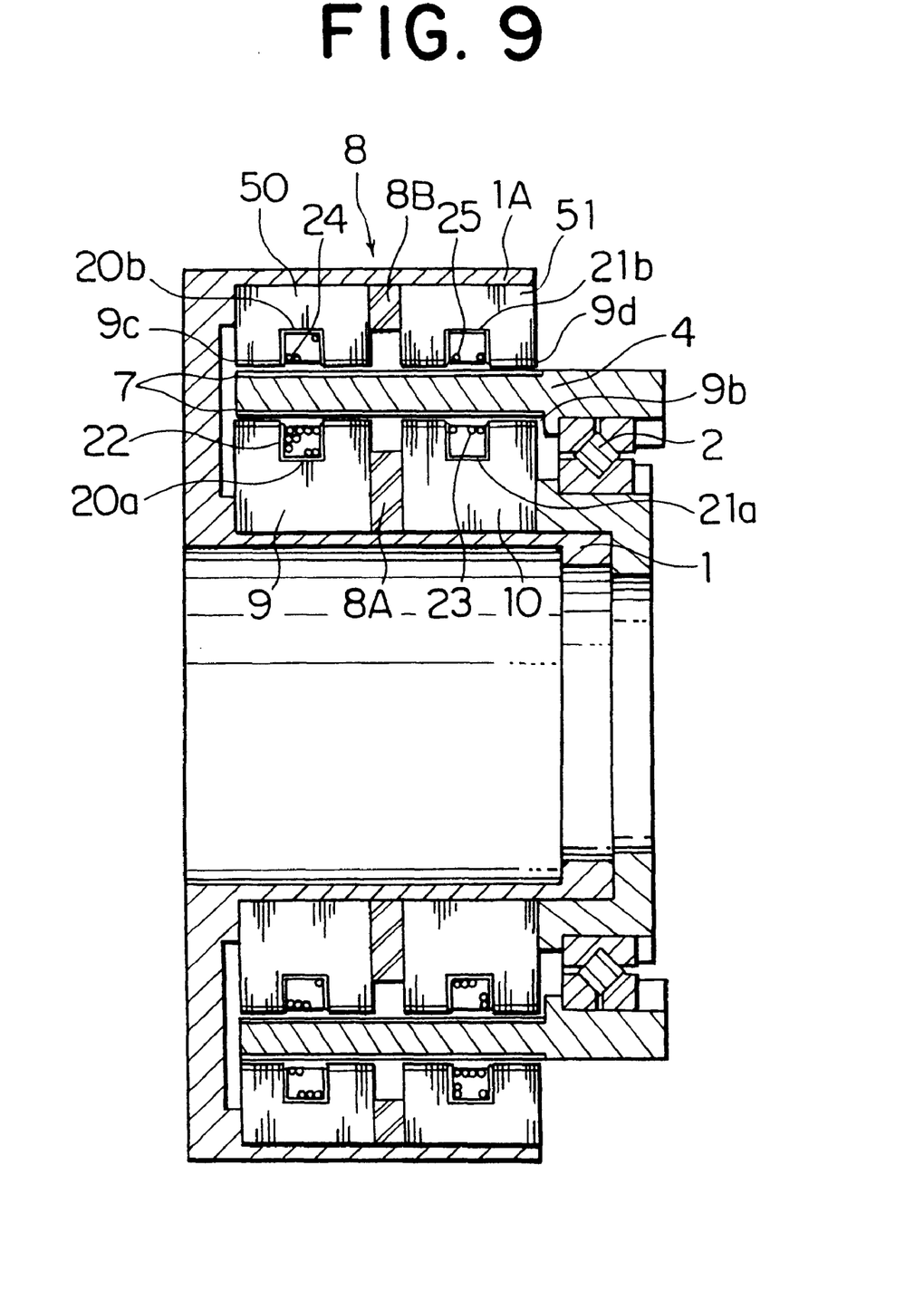
FIG. 9 is a cross-sectional view showing another example of the stepping motor of FIG. 4.
Figures 10A, 10B:
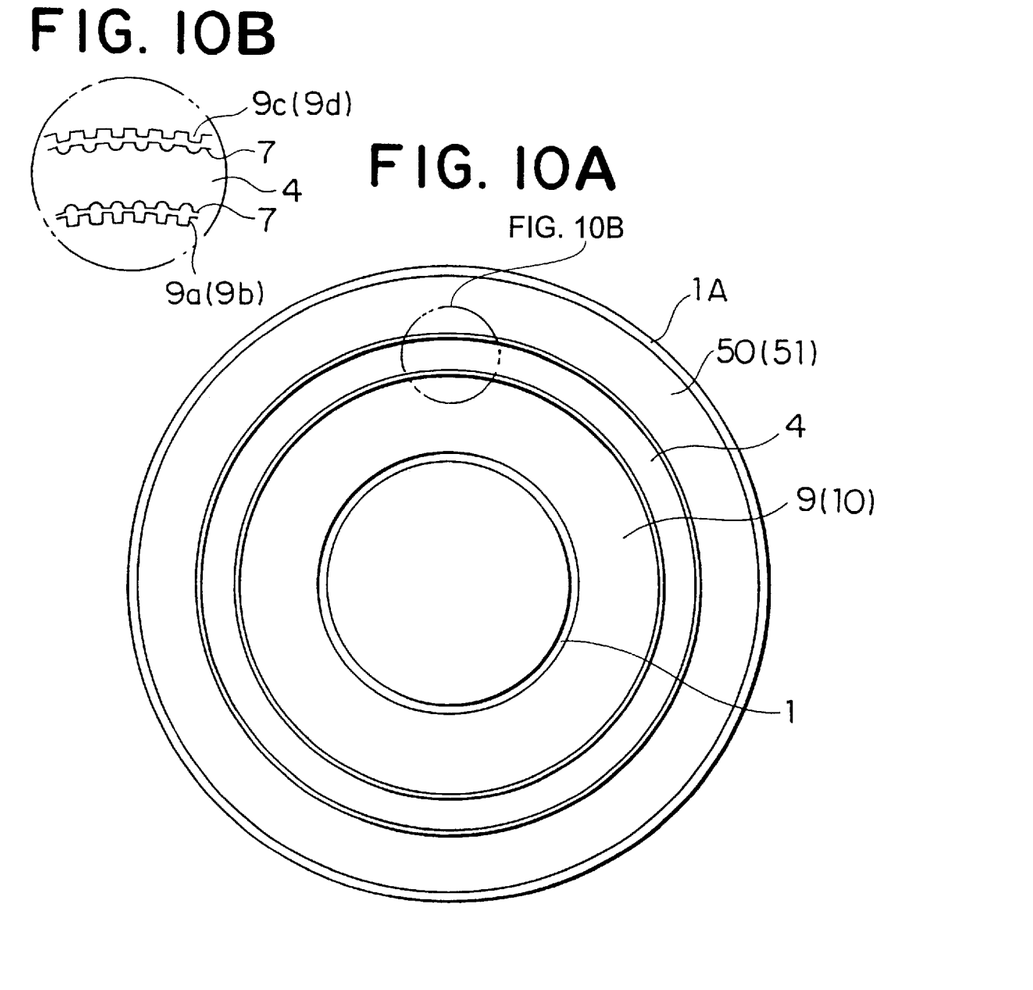
FIG. 10 is a cross-sectional view showing the stepping motor of FIG. 9.
Figure 11:
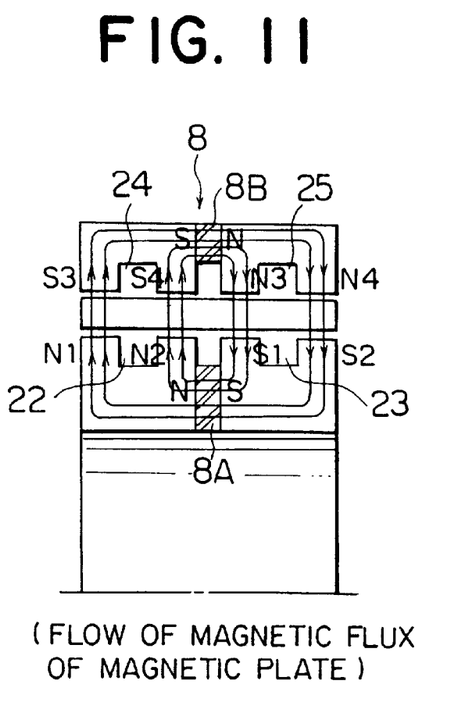
FIG. 11 is an explanatory diagram showing the flows of the magnetic fluxes generated by the magnet set.

The operation of the motor is now discussed. FIG. 6 shows the flows of the fluxes generated by the first and second magnets 8A, 8B, and FIG. 7 shows the fluxes generated by the coils 22 through 25, wherein the directions of the flows of the fluxes are determined by the directions of the current flows in the coils 22 through 25. In FIG. 8, when an unshown driving circuit allows the currents to flow through the coils 22 through 25 with the magnets 8A, 8B arranged therebetween in the directions of A and B, the rotor 4 under the known magnetic action rotates from a state 0 to state I. In succession, when the currents are allowed to flow in the directions of A bar and B bar opposite the directions of A and B, the rotor 4 rotates as shown in a state II and state III, and then returns to the state 0, completing a step rotation of one pitch of the rotor teeth 7. Since in the structure in FIG. 4, the rotor 4 itself is thinly constructed, it has a low inertia, coil winding is easy, the occupation rate of the coils is increased, and double winding coils double torque.

The coils 22, 23 are wound externally in a solenoid-on-bobbin fashion using a coil winding machine, and in case of the coils 24, 25, the stator yokes 50, 51 are cut along the dotted lines and separated there to fit the coils 24, 25 that are wound around bobbins in a solenoid fashion.

Figure 12:
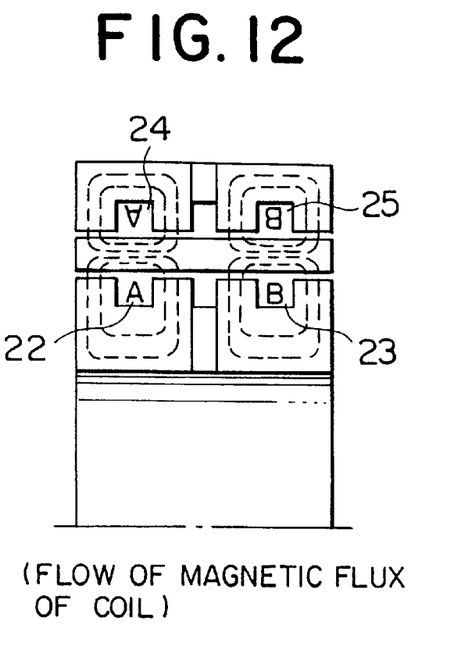
FIG. 12 is an explanatory diagram showing the flows of the magnetic fluxes generated by the coils.
Figure 13A:
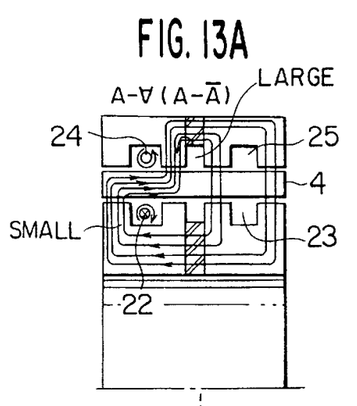
FIG. 13 is an explanatory diagram showing the step rotation of the motor.
Figure 13B:
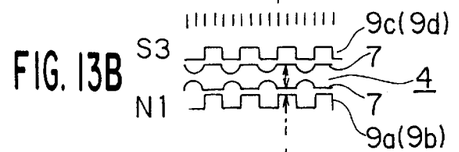
Figure 13C:
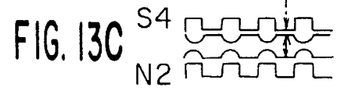
Figure 13D:
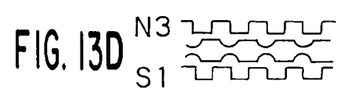
Figure 13E:
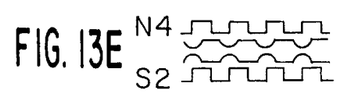
Figure 13F:
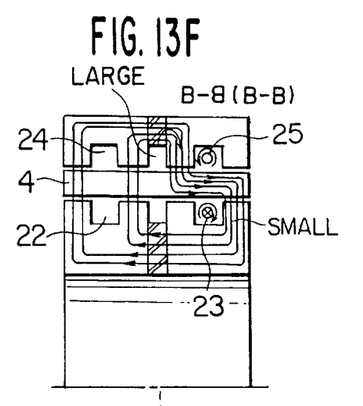
Figure 13G:
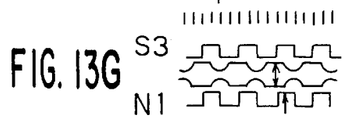
Figure 13H:
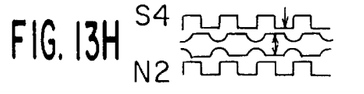
Figure 13I:
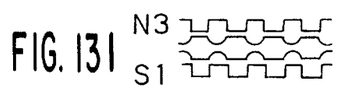
Figure 13J:
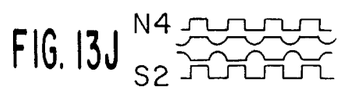
Figure 14A:
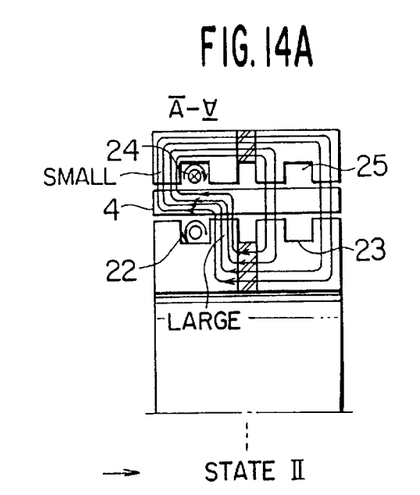
FIG. 14 is an explanatory diagram showing a continuation of the step rotation of the motor shown in FIG. 13.
Figure 14B:
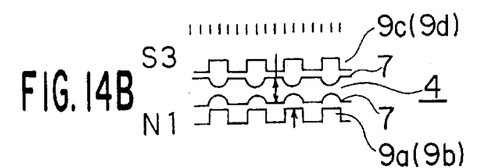
Figure 14C:
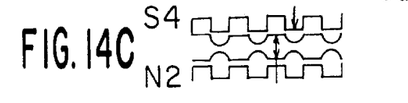
Figure 14D:
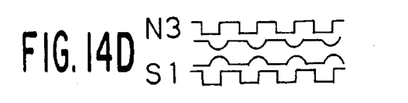
Figure 14E:
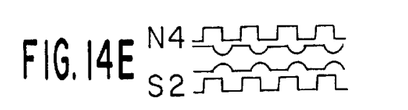
Figure 14F:
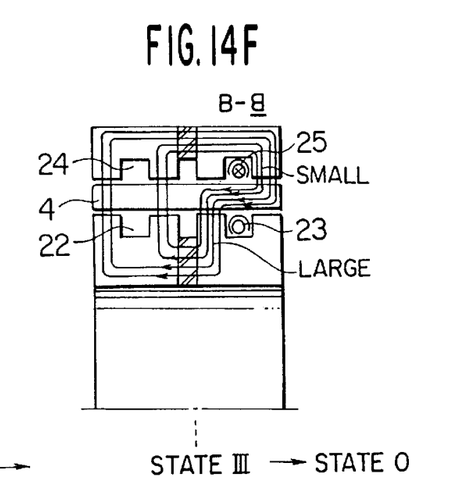
Figure 14G:
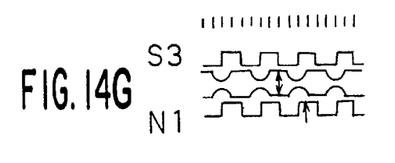
Figure 14H:
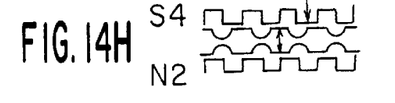
Figure 14I:
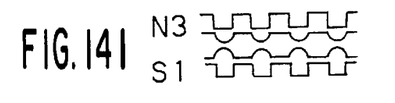
Figure 14J:
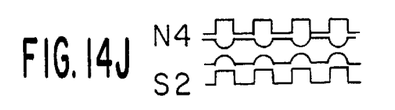

FIGS. 9 through 14 show a second embodiment, wherein the rotor 4 is thicker than the rotor 4 in FIG. 4 and its inertia is accordingly larger, but torque irregularity is prevented. Components identical to those with reference to FIGS. 4 through 8 are designated with the same reference numerals in the discussion that follows. Arrangements are made in the directions of the current flows in the coils 22 through 25 so that the coils 22 and 24 are opposite in their magnetic fluxes and the coils 23 and 25 are opposite in their magnetic fluxes as shown in FIG. 12. As shown in FIGS. 13 and 14, when the opposite currents flow in the coils 22, 24, the rotor 4 is at the state 0, and the rotor 4 shifts from the state 0 to state I with opposite currents allowed in the coils 23, 25. When the coils 22, 24 and the coils 23, 25 are current driven in the phases reverse to the states 0 and I, the rotor 4 shifts to the state II and then to the state III, completing one pitch of the teeth. In comparison with FIGS. 13 and 14, in FIG. 8, poles N1, S3, S2 and N4 that are further from the magnet set 8 generate torque in the state 0 and I, and the poles N2, S4, S1 and N3 that are closer to the magnet set 8 generate torque in the states II and III. Thus, the torque in the states II and III is slightly larger than that in the states 0 and I. In the states I through III in FIGS. 13 and 14, the further poles and the closer poles relative to the magnet set 8 contribute to torque generation in a balanced fashion (as shown in figures), and as a result, driving with less torque irregularity is achieved.

Figure 15:
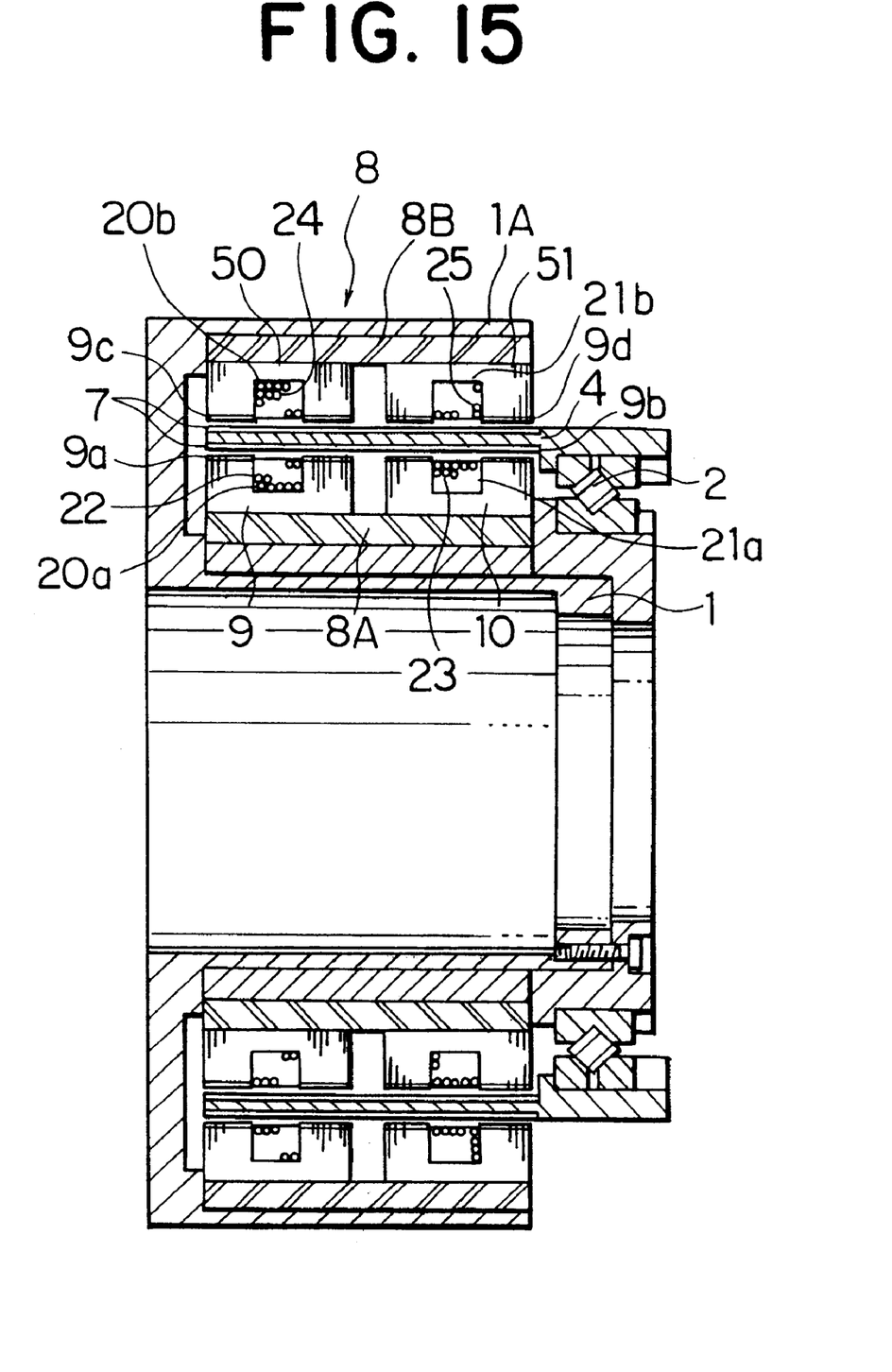
FIG. 15 is a cross-sectional view showing another example of the stepping motor.

Although in the first and second embodiments with reference to FIGS. 4 through 14, the magnets 8A, 8B are arranged in perpendicular to the direction of the shaft of the motor, the magnets 8A, 8B may be arranged, in parallel with the direction of the shaft of the motor, between the inner stator yokes 9, 10 and the fixed shaft 1 and between outer stator yokes 50, 51 and the outer wall A1 of the fixed shaft 1 as shown in FIG. 15. In FIG. 15, components identical to those with reference to previous embodiments are designated with the same reference numerals, and the operation of the stepping motor is identical to the above-described operation in principle, and thus the description of the operation is not repeated herein. In FIG. 15, it is not required that the fixed shaft 1 is non-magnetic.

The coils 22~25 are wound in the prior art solenoid-on-bobbin winding method, and its type may be bipolar winding or unipolar winding, and excitation may be performed not only in a single phase excitation but also in two-phase or single-two-phase excitation. Shifting in pitch in each of the teeth 7, 9a, and 10a is a relative value, and the same operation is performed if any teeth are shifted relative to the other.

The hybrid-type stepping motor thus constructed according to the present invention offers the following advantages. Since the coils are wound on the circumferences of the stator yokes in a bobbin-winding fashion, and the bobbin-wound coils are inserted on the other stator yokes, coil winding operation is easy, a substantially lower cost is achieved for this sort of the outer rotor structured hybrid-stepping motor, the coil occupation rate is increased, and a high torque design is achieved. Since the coils are used in double fashion, the torque is doubled accordingly. Freed of the number of phases and poles, the entire circumference of the motor is available for magnetic poles and thus a large degree of freedom in selecting the number of teeth per revolution is allowed.

What is claimed is:

1. A hybrid-type stepping motor comprising a bearing mounted on a fixed shaft, a barrel rotor rotatably supported by the bearing, a plurality of rotor teeth provided on the outer circumference and inner circumference of the barrel rotor, first and second inner stator yokes arranged side by side in the direction of the fixed shaft with a magnet set therebetween and first and second outer stator yokes arranged side by side in the direction of the fixed shaft with the magnet set therebetween, a plurality of stator yoke teeth, first through fourth axially centered circular coil slots facing the barrel rotor and formed around the outer circumference of the first and second inner stator yokes and the inner circumference of the first and second outer stator yokes, and first through fourth coils wound in a solenoid fashion and seated in the respective coil slots, whereby the stator yokes alternate in polarity and the barrel rotor is interposed between the coils;

wherein said magnet set comprises a first magnet interposed between the fixed shaft and the inner stator yokes and a second magnet interposed between the outer stator yokes and the outer wall of the fixed shaft, whereby the magnets face towards each other via the barrel rotor; and wherein the plurality of rotor teeth provided on the outer and inner circumference of the barrel rotor are of the same shape and pitch, such that the barrel rotor moves only in the rotary direction.

* * * * *